(12) United States Patent
Loach et al.

(10) Patent No.: US 6,356,966 B1
(45) Date of Patent: Mar. 12, 2002

(54) SYSTEM AND METHOD FOR BRIDGING BUS SEGMENTS ON A BACKPLANE AND COUPLING SINGLE BOARD COMPUTERS TO A BACKPLANE

(75) Inventors: Charles A Loach, San Diego; Julian J. Yutkus, Riverside, both of CA (US)

(73) Assignee: APW Ltd., Waukesha, WI (US)

( * ) Notice: Subject to any disclaimer, the term of this patent is extended or adjusted under 35 U.S.C. 154(b) by 0 days.

(21) Appl. No.: 09/659,344

(22) Filed: Sep. 12, 2000

(51) Int. Cl.[7] .......................... G06F 13/00; G06F 13/38; G06F 13/40
(52) U.S. Cl. ...................... 710/126; 710/128; 710/129; 710/101; 710/102; 439/82
(58) Field of Search ................................ 710/126, 128, 710/129, 101, 102; 439/82

(56) References Cited

U.S. PATENT DOCUMENTS

| | | | |
|---|---|---|---|
| 4,777,615 A | * | 10/1988 | Potash |
| 5,530,810 A | * | 6/1996 | Bowman ................... 710/103 |
| 5,530,811 A | * | 6/1996 | Benton et al. ............... 710/126 |
| 5,838,899 A | * | 11/1998 | Leavitt et al. ................ 714/56 |
| 5,951,665 A | * | 9/1999 | Crane, Jr. et al. ........... 710/126 |
| 5,982,634 A | * | 11/1999 | Wronski ..................... 361/788 |
| 6,092,139 A | * | 7/2000 | Crane, Jr. et al. ........... 710/127 |
| 6,202,110 B1 | * | 3/2001 | Coteus et al. ............... 710/102 |

* cited by examiner

Primary Examiner—Rupal Dharia
(74) Attorney, Agent, or Firm—Quarles & Brady LLP

(57) ABSTRACT

A backplane assembly in accordance with cPCI bus architecture includes a backplane having a front side and a back side, a plurality of 7-row connectors, at least one 7-row shroud coupled to the front side of the backplane, and at least one 10-row connector. The plurality of 7-row connectors are coupled to the front side of the backplane, and each of the 7-row connectors includes a plurality of pins that extend from within an interior of the backplane out through the front side of the backplane into the respective 7-row connector. The at least one 10-row connector is coupled to the back side of the backplane, and includes a plurality of extended pins that extend from within the interior of the backplane out through the front side of the backplane into the at least one 7-row shroud and out through the back side of the backplane into the at least one 10-row connector.

18 Claims, 13 Drawing Sheets

SYSTEM AND METHOD FOR BRIDGING BUS SEGMENTS ON A BACKPLANE AND COUPLING SINGLE BOARD COMPUTERS TO A BACKPLANE

FIELD OF THE INVENTION

The present invention relates to Compact Peripheral Component Interconnect (cPCI) bus architecture and, more particularly, to systems for bridging cPCI bus segments on a backplane and coupling Single Board Computers (SBCs) to the backplane.

BACKGROUND OF THE INVENTION

PCI (Peripheral Component Interconnect) is the dominant bus architecture for computers that are based upon Intel and comparable microprocessors. This architecture is used in several applications including PC motherboards, passive backplane systems, and CompactPCI (cPCI). The PCI architecture is limited in terms of the number of PCI load devices on expansion boards that any given bus segment can support. When an application requires more expansion devices than a given bus segment can support, the use of a PCI to PCI Bridge is required. The PCI to PCI Bridge acts as a repeater and amplifies the bus signals so that the bus signals can be provided to additional expansion devices. For passive backplane architecture, the addition of a bridge to the backplane is relatively simple. Usually, there is ample space on the backplane itself to place the bridge components and to route the traces necessary for proper connection of the bridge to the remainder of the backplane. For cPCI architecture, however, where the number of slots that are available on the backplane for coupling devices to the backplane is a valuable feature and active circuitry on the backplane is discouraged, insufficient room exists on the backplane to place bridge components on the backplane itself.

At least two strategies are currently known for adding a bridge to a backplane having cPCI architecture. Both of these strategies involve placing the bridge components on a daughter board that plugs into the backplane. Referring to FIG. 1, one prior art system employs a single circuit board 20 with bridging components that connects at two points to a backplane 10 having multiple slots 12 (pins in slots not shown) including slots 12a–12h. Specifically, the circuit board 20 connects to the rear of the backplane 10 at two of the slots 12d and 12h, and is mounted parallel to the backplane between those slots. Because the circuit board 20 connects to two separate slots 12d and 12h, which in the embodiment of FIG. 1 are positioned four slots apart from one another, this bridge implementation is commonly termed a "mezzanine bridge". Turning to FIGS. 2 and 3, a second known system for bridging bus segments on a backplane having cPCI architecture employs one or more circuit boards 30 that extend from the backplane 10 at right angles to the backplane. The one or more circuit boards 30 can plug into the backplane 10 from either the front or rear of the backplane. This bridge implementation can be termed a "plug-in card bridge".

Although both of these bridge systems provide functional bus expansion, both systems have significant undesirable effects. First, both systems reduce the total number of slots that are available on a backplane for connection to expansion devices. This is due to the nature of cPCI architecture. In accordance with cPCI architecture, the backplane 10 must have a system slot followed by 1 to 7 expansion slots. For example, with reference to FIG. 1, the backplane 10 includes a system slot 12a followed by 7 successive expansion slots 12b–12h. The system slot 12a is the location at which a system board, usually a Single Board Computer (SBC) which has the main system processor, is connected to the backplane 10. The system slot 12a is unique from the other slots in that all bus clocks, bus requests, bus grants, and other bus control signals originate at the system slot. Only the main system processor can be installed into the system slot 12a.

As shown in FIG. 1, the circuit board 20 of the mezzanine bridge receives bus signals from the backplane 10 at slot 12d and outputs bus signals into the rear of the backplane slot 12h. Consequently, slot 12h effectively becomes a new system slot and cannot be connected to any expansion device. As a result, one expansion slot position is always lost when a mezzanine bridge is employed. A reduction in the number of available expansion slots can likewise occur when a plug-in card bridge is employed. Typically, at least one slot and sometimes two slots are required to accommodate the bridging board or boards in the plug-in card bridge implementation. For applications in which a maximum "board to slot" count is required, these reductions in the number of available expansion slots on the backplane 10 due to bridging are not acceptable.

In addition to reducing the number of expansion devices that can be connected to a given backplane, both of the conventional strategies for bridging bus segments on a backplane compromise the input/output (I/O) possibilities of the cPCI architecture. Typically, the cPCI architecture allows "pass through" I/O from boards that are connected to the slots 12 on the front of the backplane 10, to plug-in I/O transition boards connected to the rear of the backplane. However, when a mezzanine bridge is used, several slots typically become unavailable for use with the rear I/O transition boards. For example, in the embodiment shown in FIG. 1, four slots 12d–12g that could potentially be used for I/O transition boards are lost due to the positioning of the circuit board 20. In the case of the plug-in card bridge implementations of FIGS. 2 and 3, each of the slots 12 at which a circuit board 30 is connected to the backplane 10 is lost for use with 110 transitioning boards. That is, one slot is lost with the embodiment shown in FIG. 2, and two slots are lost with the embodiment shown in FIG. 3.

The bridging of backplanes is only one situation in which the availability of slots of backplanes using the cPCI architecture is undesirably reduced. A similarly undesirable result occurs when it is necessary to connect a Single Board Computer (SBC) to a backplane and interface the SBC to multiple cPCI bus segments. Although the embodiment of FIG. 4 shows the SBC 40 to be coupled to four connectors 14a, 14b, 14d and 14e that are positioned along the single slot 12h, in alternate embodiments the SBC is coupled to two pairs of the connectors 14 that are positioned on two adjacent slots, e.g., connectors 14a and 14b of each of slots 12g and 12h.

Each of the conventional strategies for attaching an SBC to a backplane can undesirably limit the slots that are available for connecting expansion devices to the backplane. Typically the SBC 40 has a significant width due to the CPU 42, which results in the SBC blocking access to one or more adjacent slots. For example, with reference to the embodiment shown in FIG. 4, the SBC 40 blocks access to slot 12g due to the width of the CPU 42. Further, in certain embodiments a daughter board (not shown) must additionally be coupled to the SBC 40 in order to allow proper routing of signals. The existence of the daughter board also results in an increased overall width of the SBC assembly such that access to an additional adjacent slot, e.g., slot 12i, is blocked.

The conventional strategies for attaching an SBC have other undesirable characteristics as well. For example, the SBC 40 of FIG. 4 requires at least five inches of extra trace length in the backplane for the second bus segment. This violates the 7.3" trace length limit stated in the PCI Industrial Computers Manufacturers Group (PICMG) 2.0 R2.1 and R3.0 specifications for trace length for cPCI bus segments. Further, the configuration of the SBC 40 of FIG. 4 precludes the use of the upper two connectors for rear I/O. Additionally, in the case of an SBC assembly that includes a daughter board, the SBC assembly suffers from additional increased exposure to interference due to the impedance of stubs (not shown) that typically exist on the daughter board.

Therefore, it would be advantageous if a new system and method were developed for adding bridges to, and connecting SBCs to, backplanes designed in accordance with the cPCI architecture. In particular, it would be advantageous if the new system and method enabled the bridging of bus segments on a backplane, as well as the attachment of a SBC to a backplane, with less of a reduction in the number of slots along the backplane that are available for connection to expansion devices. Additionally, it would be advantageous if such a system and method required less of a reduction in the number of slots available for connection to I/O transitioning boards than conventional systems and methods and if the components of such systems and methods were less susceptible to outside interference than the components of conventional systems and methods. Further, it would be advantageous if the new system and method still conformed with existing standards relating to cPCI architecture.

SUMMARY OF THE INVENTION

The present invention provides a backplane in accordance with the cPCI architecture that can be configured to include one or more expanded slots in which 10-row connectors, as opposed to standard 7-row connectors, are employed. The routing of the backplane is configured to be capable of receiving the pins of 9 rows of the 10-row connectors at the expanded slots, as opposed to merely the pins of 7 rows of 7-row connectors. When it is desired to add a bridge to the backplane, 10-row connectors are provided on a rear side of the backplane. The pins of 6 rows of the 10-row connectors extend through the backplane into 7-row shrouds that are provided on a front side of the back plane. The shrouds and the extended pins effectively form standard 7-row connectors on the front side of the backplane. Further, the pins of 3 remaining rows of the 10-row connectors extend only into the backplane (the 10-row connectors only employ pins in 9 of their rows).

Given such a backplane structure, a bridge can be connected to the backplane structure at the 10-row connectors. Bus signals are input into the bridge via the pins of the 6 rows of the 10-row connectors which extend from the 10-row connectors into the 7-row shrouds. At the same time, the bus signals can still be additionally provided to an expansion device connected to the 7-row connectors formed by the 7-row shrouds and the extended pins on the front side of the backplane. Therefore, the present invention allows bus signals to be provided to an input of a bridge without precluding connection of an expansion device at the same slot location along the backplane. Further, the bus signals that are provided to the bridge, upon being amplified and processed by the bridge, are returned to the backplane via the pins of the 3 remaining rows of the 10-row connectors. Consequently, the reduction in the number of slots available for I/O connection along the back side of the backplane is limited to a loss of at most one slot.

When it is desired to couple a SBC to the backplane, 10-row connectors are provided on the front side of the backplane, in place of 7-row connectors. Pins from 9 of the rows of the 10-row connectors extend from the 10-row connectors into the backplane. Pins from 6 of those rows receive signals from the SBC concerning a first bus signal to be provided by the backplane to a first set of slots, at which expansion devices can be connected to the backplane. The pins of the 3 remaining rows of pins of the 10-row connectors receive signals from the SBC concerning a second bus signal to be provided by the backplane to a second set of slots, at which expansion devices can also be connected to the backplane. Through the use of the 10-row connectors, the SBC requires coupling to fewer connectors, does not require coupling to multiple connectors positioned along the entire (or nearly the entire) length of a slot, and does not require a daughter board. Consequently, the SBC can be connected to the backplane with less of a reduction in the number of slots that are available for connection to expansion devices, in conformance with the PICMG specifications, and with less exposure to interference, than occurs with conventional systems.

In particular, the present invention relates to a backplane assembly in accordance with cPCI bus architecture, which includes a backplane having a front side and a back side, a plurality of 7-row connectors, at least one 7-row shroud coupled to the front side of the backplane, and at least one 10-row connector. The plurality of 7-row connectors are coupled to the front side of the backplane, and each of the 7-row connectors includes a plurality of pins that extend from within an interior of the backplane out through the front side of the backplane into the respective 7-row connector. The at least one 10-row connector is coupled to the back side of the backplane, and includes a plurality of extended pins that extend from within the interior of the backplane out through the front side of the backplane into the at least one 7-row shroud and out through the back side of the backplane into the at least one 10-row connector.

The present invention additionally relates to a backplane assembly in accordance with cPCI bus architecture, which includes a backplane and a plurality of slots on backplane at which the backplane is configured to be coupled to connectors placed along a first side of the backplane. The backplane assembly further includes a plurality of 7-row connectors coupled to the first side of the backplane at some of the slots, wherein each of the 7-row connectors includes a plurality of pins that extend from within an interior of the backplane out through the first side of the backplane into the respective 7-row connector. The backplane assembly additionally includes a 10-row connector coupled to the first side of the backplane at a respective one of the slots. The 10-row connector includes a plurality of pins that extend from within the interior of the backplane out through the first side of the backplane into the 10-row connector.

The present invention further relates to a backplane assembly in accordance with cPCI bus architecture, which includes a backplane having a first surface and a second surface, and a 10-row slot in the backplane. The 10-row slot includes at least 9 rows of pin locations at which the backplane is configured to receive pins extending transversely into the backplane from at least one of the first surface of the backplane and the second surface of the backplane. The backplane assembly additionally includes a plurality of 7-row slots in the backplane, each of the 7-row slots including 7 rows of pin locations at which the backplane is capable of receiving pins extending transversely into the backplane from at least the first surface of the backplane. At least a first 7-row slot exists on a first side of the 10-row slot and at least a second 7-row slot exists on a second side of the 10-row slot. The backplane assembly further includes a routing means for coupling at least some of the pin locations of the at least 9 rows of the 10-row slot with at least some of the pin locations of at least some of the 7 rows of at least some of the 7-row slots. The backplane assembly additionally comprises a plurality of connectors positioned adjacent to at least some of the 7-row slots and the 10-row slot.

The present invention also relates to a method of bridging a first bus signal on a backplane assembly. The method comprises providing a backplane with a 10-row slot having at least 9 rows of pin locations, and attaching a 7-row shroud to the 10-row slot along a front side of the backplane. The method additionally comprises attaching a 10-row connector to the 10-row slot along a back side of the backplane, wherein the 10-row connector includes at least 6 rows of pins that extend from the 10-row connector through the backplane into the 7-row shroud, and wherein the 10-row connector further includes at least 3 rows of pins that extend from the 10-row connector into the backplane, the backplane assembly including the backplane, the 7-row shroud and the 10-row connector. The backplane assembly is capable of being coupled to a bridge at the 10-row connector along the back side of the backplane, providing the first bus signal to the bridge by way of the at least 6 rows of pins by way of a plurality of routing connections supported by the backplane, and receiving a processed bus signal at the backplane from the bridge by way of the at least 3 rows of pins.

The present invention further relates to a method of providing a first bus signal and a second bus signal from a SBC to a backplane assembly. The method comprises providing a backplane with a first slot having at least 9 rows of pin locations including a first set of 6 rows of pin locations and a second set of 3 rows of pin locations, and providing on the backplane second and third slots respectively positioned on first and second sides of the first slot, the second and third slots each having at least 7 rows of pin locations. The method additionally comprises attaching a 10-row connector to the first slot along a front side of the backplane, wherein the 10-row connector includes a first set of 6 rows of pins and a second set of 3 rows of pins that are respectively coupled to the first and second sets of pin locations, and attaching at least one 7-row connector to each of the second and third slots. The method further comprises providing a set of routing connections within the backplane coupling the first set of 6 rows of pin locations and the second set of 3 rows of pin locations to the at least 7 rows of pin locations at the second and third slots, respectively. The backplane assembly is capable of being coupled to the SBC at the 10-row connector, receiving the first bus signal at the first set of 6 rows of pins and receiving the second bus signal at the second set of 3 rows of pins.

DETAILED DESCRIPTION OF THE INVENTION

Figure 5:
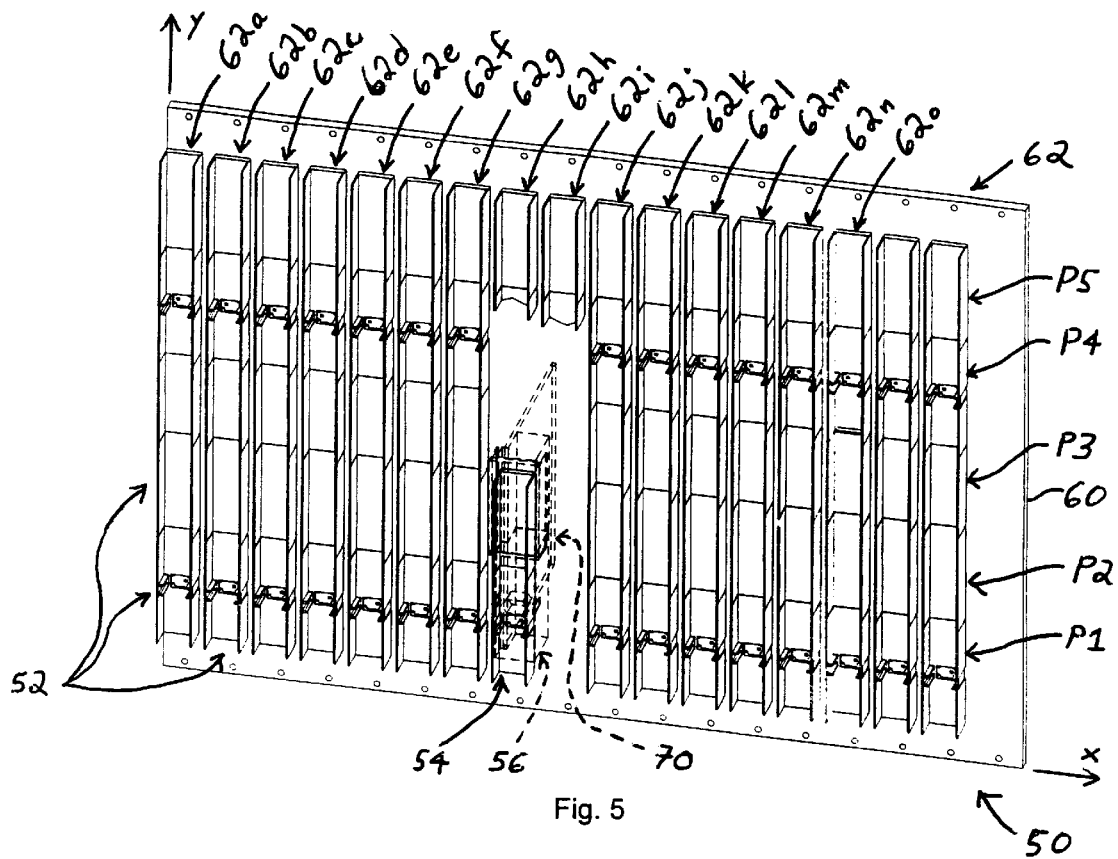
FIG. 5 is a perspective view of a new backplane assembly with a portion of the backplane assembly shown in cut-away, where the backplane assembly is shown coupled to a bridge in accordance with one embodiment of the present invention.

Referring to FIG. 5, a new backplane assembly 50 includes a backplane 60 having a plurality of slots 62, including slots 62a–62o. Also included within the backplane assembly 50 along a front side of the backplane 60 are multiple male 7-row connectors 52 corresponding to the slots 62. Typically, sets of five of the 7-row connectors 52 are arranged along slots 62, in five positions P1–P5. Each of the 7-row connectors 52 includes 7 rows of pins (not shown) which project from the connectors into the backplane 60. Although 7-row connectors 52 are arranged on the front side of the backplane 60 along most of slots 62, including at positions P3–P5 of slot 62h, two 7-row shrouds 54 are coupled at positions P1 and P2 of slot 62h instead of 7-row connectors. The 7-row shrouds 54 are capable of receiving pins projecting out of the backplane 60 and, upon receiving such pins, acting effectively the same as the 7-row connectors 52.

Figure 6:
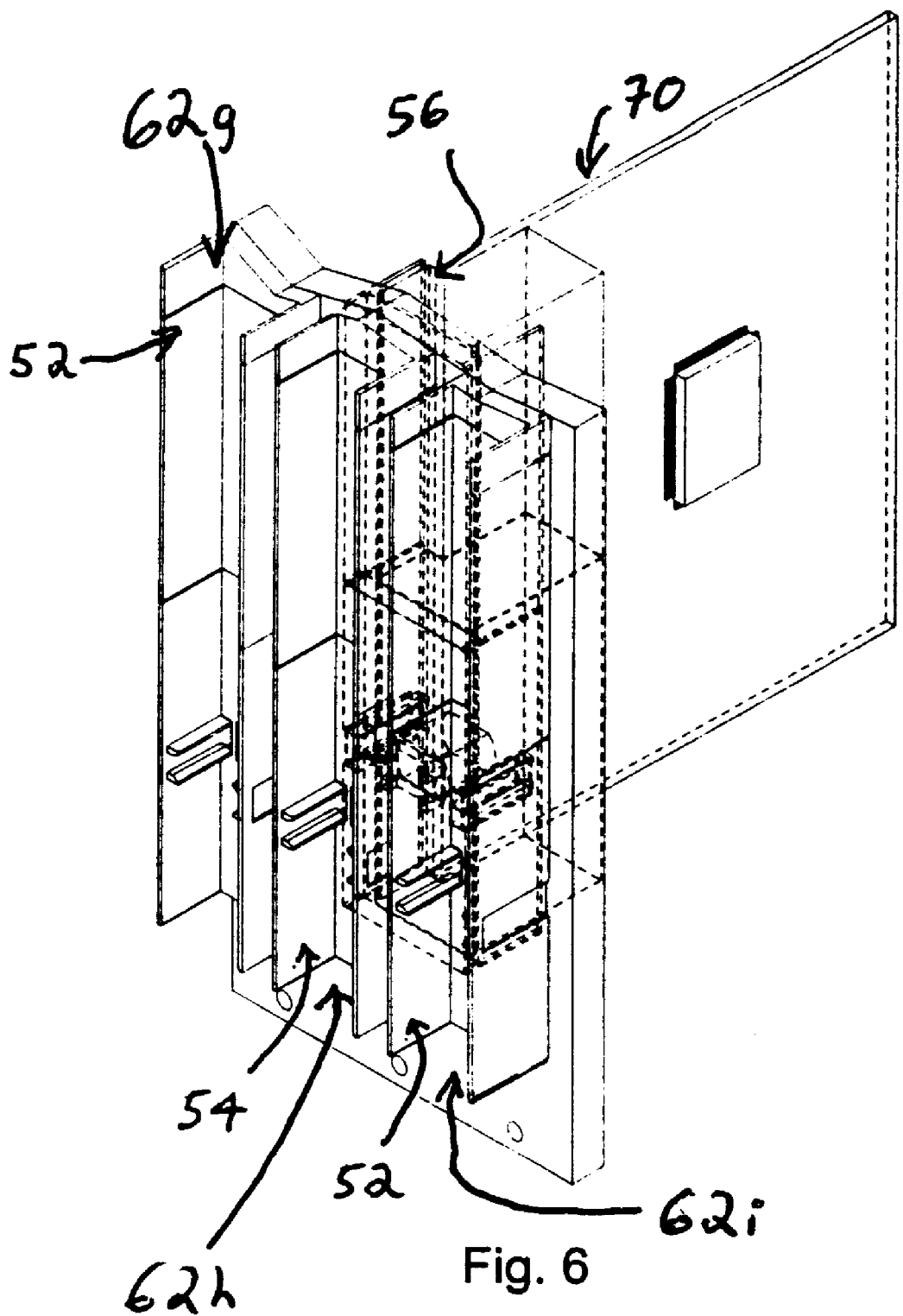
FIG. 6 is a perspective view of a cut-away section of the new backplane assembly and bridge shown in FIG. 5.
Figure 7:
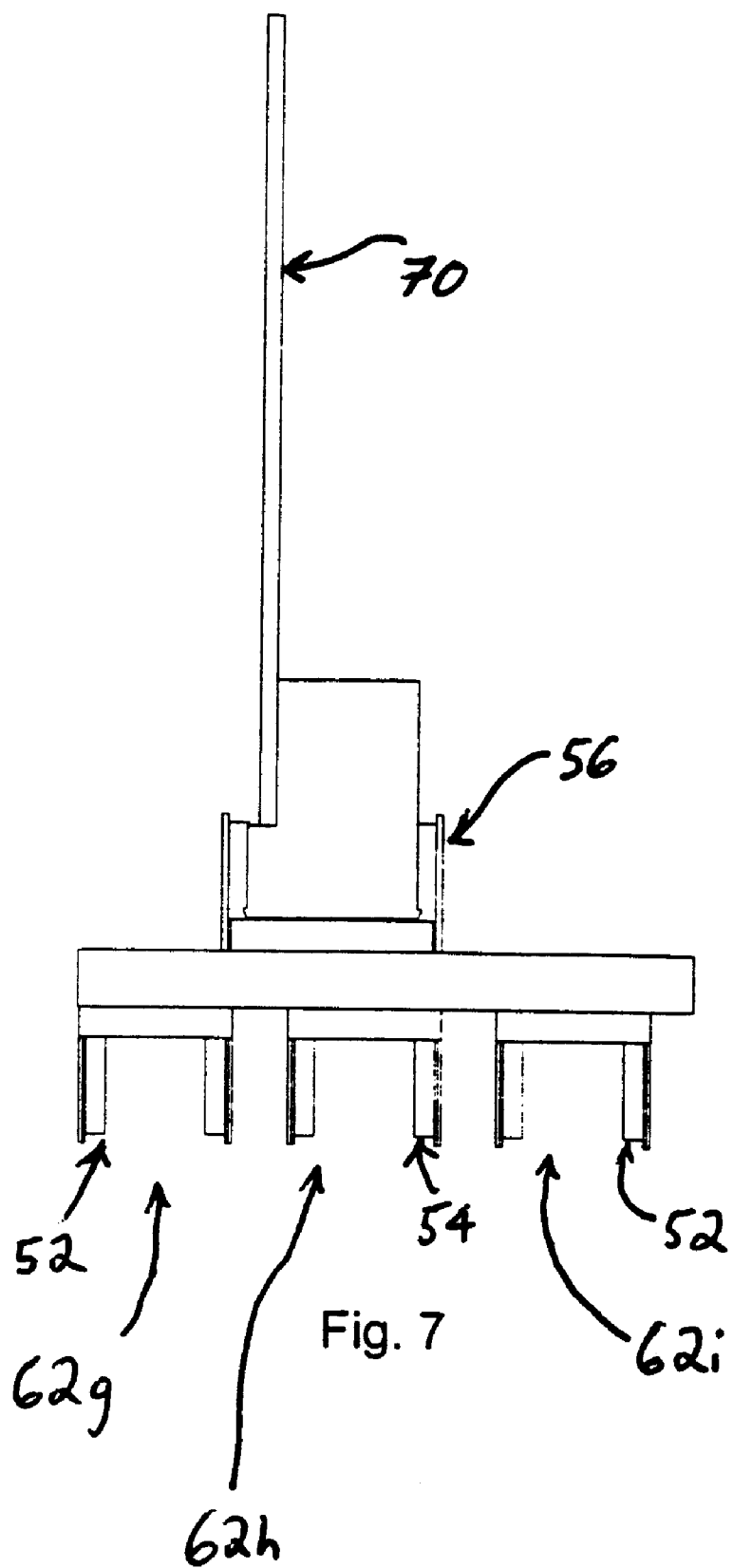
FIG. 7 is a plan view of the cut-away section of the new backplane assembly and bridge shown in FIG. 6.

Additionally, FIG. 5 shows a portion of the backplane assembly 50, proximate to slots 62h and 62i, in cut-away to reveal two 10-row connectors 56 on the back side of the backplane 60 also placed along positions P1 and P2 of slot 62h. The 10-row connectors 56 are compliant to the IEC 6010764-101 standard, and are shown coupled to a bridge 70 in accordance with one embodiment of the present invention. The 10-row connectors 56 are custom loaded with 9 rows of pins (not shown). 6 rows of the pins are extended and project through the backplane 60 into the 7-row shrouds 54, while 3 rows of the pins project only into the backplane. The custom-loaded 10-row connectors 56 are positioned at slot 62h because slot 62h is the last slot location of the first PCI bus segment of the backplane assembly 50. FIGS. 6 and 7 respectively show a perspective view and a plan view of a cutaway portion of the backplane assembly 50 of FIG. 5, along with the bridge 70 coupled to the 10-row connectors 56 on the back side of the backplane 60. In particular, FIGS.

6 and 7 show the portion of the backplane 60 that includes slots 62g, 62h and 62i. As shown in FIGS. 6 and 7, on its front side, the backplane 60 is coupled to the 7-row connectors 52 at slots 62g and 62i and to the 7-row shrouds 54 at slot 62h and, on its back side, the backplane is coupled to the 10-row connectors 56 at slot 62h.

Figure 8:
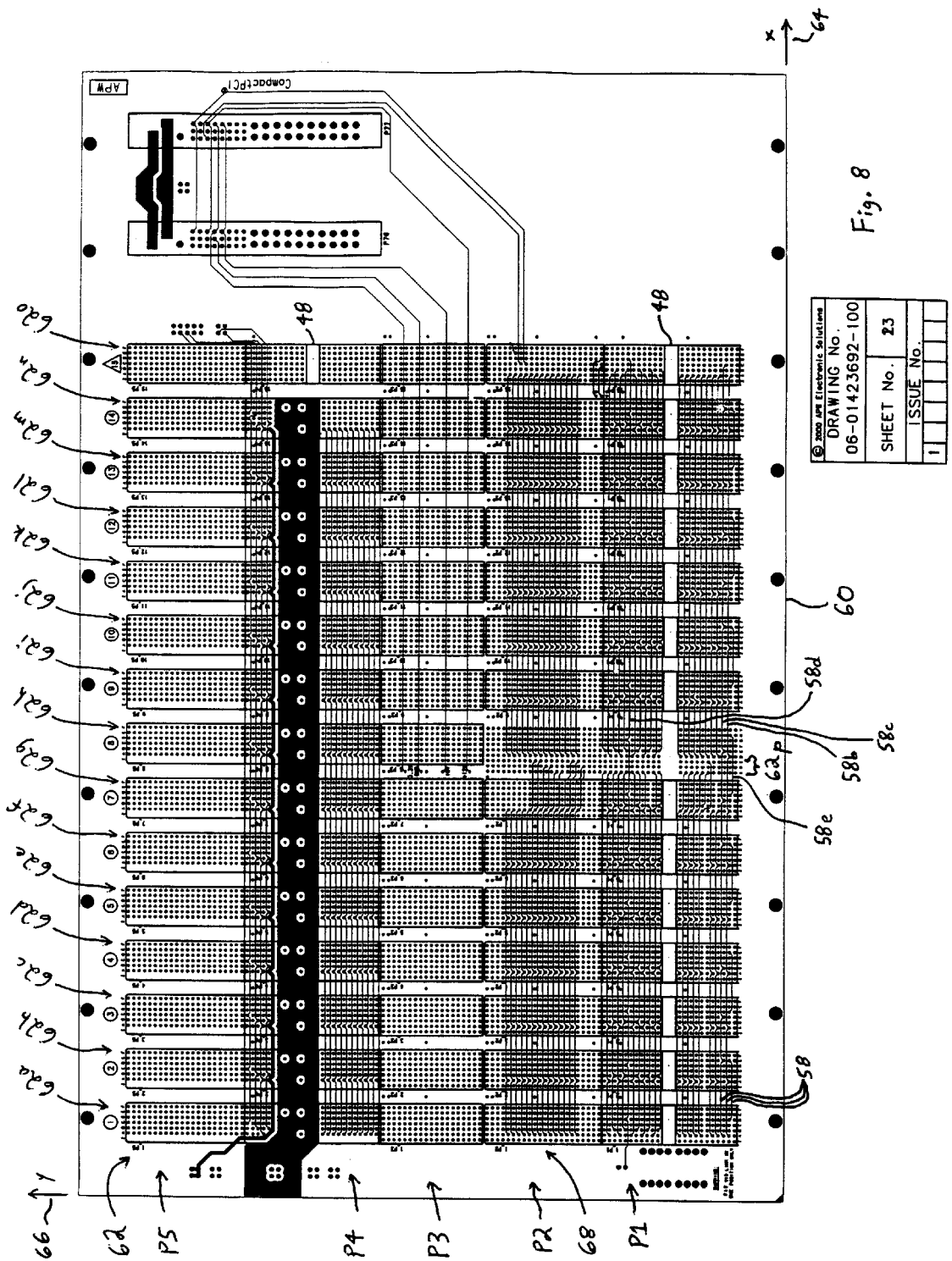
FIG. 8 is an elevation view of an exemplary layer of routing connections within a new backplane of the new backplane assemblies of FIGS. 5–7 and 10–13.

Turning to FIG. 8, an elevation view of an exemplary layer of routing connections 58 within the backplane 60 (viewed from the front side of the backplane) shows pin locations 68 corresponding to the slots 62a–62o, many of which pin locations are coupled to the routing connections 58. As shown, each of the slots 62a–62o except for slot 62h (discussed below) includes 7 rows Z–F of pin locations 68 spaced across the respective slot parallel to a x-axis 64 of the backplane 60. Specifically, the 7 rows of pin locations 68 are ordered Z, A, B, C, D, E and F as one progresses in the positive x direction. The pin locations 68 of the 7 rows Z–F correspond to the 7 rows of pins of the 7-row connectors 52 shown in FIG. 5. Pins from the 7-row connectors 52 are coupled to the pin locations 68 on the backplane 62 and thus at least some of the pins from the 7-row connectors are coupled to the routing connections 58 on the backplane 60.

Each of the 7 rows Z–F of pin locations 68 of each slot 62 include multiple pin locations spaced along a y-axis 66 of the backplane 60. Specifically with respect to the embodiment shown in FIG. 8, each of the rows of pin locations 68 within each slot 62 includes 107 pin locations spaced parallel to the y-axis 66. The 107 pin locations 68 of each row include five subsets of pin locations corresponding to each of positions P1–P5, at which different types of 7-row connectors 52 are arranged. Specifically, each row of 107 pin locations 68 is broken down into a first row of 22 pin locations plus a key location 48 at position P1, a second row of 22 pin locations at position P2, a third row of 19 pin locations at position P3, a fourth row of 22 pin locations plus a key location 48 at position P4, and a fifth row of 22 pin locations at position P5. Consequently, each of the slots 62 having 7 rows of pin locations 68 is configured to be coupled at positions P1 and P4 to Type-A 7-row connectors having 22 pins in each row plus keys (not shown), at positions P2 and P5 to Type-B 7-row connectors having 22 pins in each row without keys, and at position P3 to a Type-B 7-row connector having 19 pins in each row.

As shown in FIG. 8, slot 62h differs from the other slots insofar as a portion of the slot at positions P1–P2 includes 9 rows A–Y of pin locations 68 rather than merely 7 rows Z–F. Specifically, the 9 rows of pin locations 68 are ordered A, B, C, D, E, F, G, H and Y as one progresses in the positive x direction. The alignment of the 9 rows A–Y at positions P1–P2 is shifted relative to the alignment of the 7 rows Z–F of pin locations at positions P3–P5 such that rows D–Y of the 9 rows correspond to rows A–F of the 7 rows. The existence of 9 rows of pin locations 68 at positions P1–P2 of slot 62h of the backplane 60 allows for the coupling of 9 rows of pins from 10-row connectors 56 along the back side of the backplane to routing connections 58 within the backplane. As discussed, 6 rows of pins from the 10-row connectors 56, specifically at rows D–Y, are extended to project through the backplane 60 into the 7-row shrouds 54 on the front side of the backplane. The remaining 3 rows of pins from the 10-row connectors 56, which are standard in length and do not extend into the 7-row shrouds 54, are the rows of pins corresponding to rows A through C at positions P1–P2. Row C at positions P1–P2 is not generally used to couple signals between the backplane 60 and expansion devices connected to the front side of the backplane. Consequently, no pins need to be extended through the backplane 60 to the 7-row shrouds 54 at row C.

Further as shown in FIG. 8, the routing connections 58 of the backplane 60 are connected in a special manner with respect to the pin locations 68 at positions P1–P2 of slot 62h. Normally, the routing connections 58 of a PCI bus are laid out so that bus signals of the PCI bus are coupled to corresponding pins of rows A–E of multiple slots 62 (row F of each 7-row slot is typically used for ground). For example, as shown in FIG. 8, multiple routing connections 58 exist to couple corresponding pins among slots 62a–62g and slots 62h–62o. According to the present invention, however, virtually no routing connections 58 (that is, except for three routing connections 58b–58d) exist to couple pin locations at positions P1 and P2 of slots 62a–62g across slot 62h to pin locations of slots 62h–62o. Consequently, bus signals that are communicated to slots 62a–62h are not communicated beyond slot 62h to slots 62i–62o, and bus signals that are communicated to slots 62h–62o are not communicated to slots 62a–62g.

FIG. 8 additionally shows that the pin locations 68 at positions P1–P2 of rows A–C of slot 62h are coupled by routing connections 58 exclusively to pin locations within slots 62a–62g, while the pin locations of rows D–Y are coupled by routing connections exclusively to pin locations within slots 62i–62o (with the exceptions of routing connections 58b–d and an additional routing connection 58e). Each of the layers of routing connections of the backplane 60 are similar to the exemplary layer of FIG. 8, and an exact pinout of the pin locations 68 at positions P1–P2 of slot 62h is provided in Table 1. Therefore, the bus of backplane 60 at positions P1–P2 is effectively separated into two separate buses, one extending from slot 62a through row C of slot 62h, and one extending from row D of slot 62h through slot 62o. The pin locations 68 at positions P1–P2 of rows A–C of slot 62h effectively form an additional or "phantom" slot 62p at which additional pins other than those of the standard 7-row connectors 52, namely the pins corresponding to rows A–C from the 10-row connectors 56, are electrically coupled to the pin locations 68 of slots 62a–g.

Figure 9:
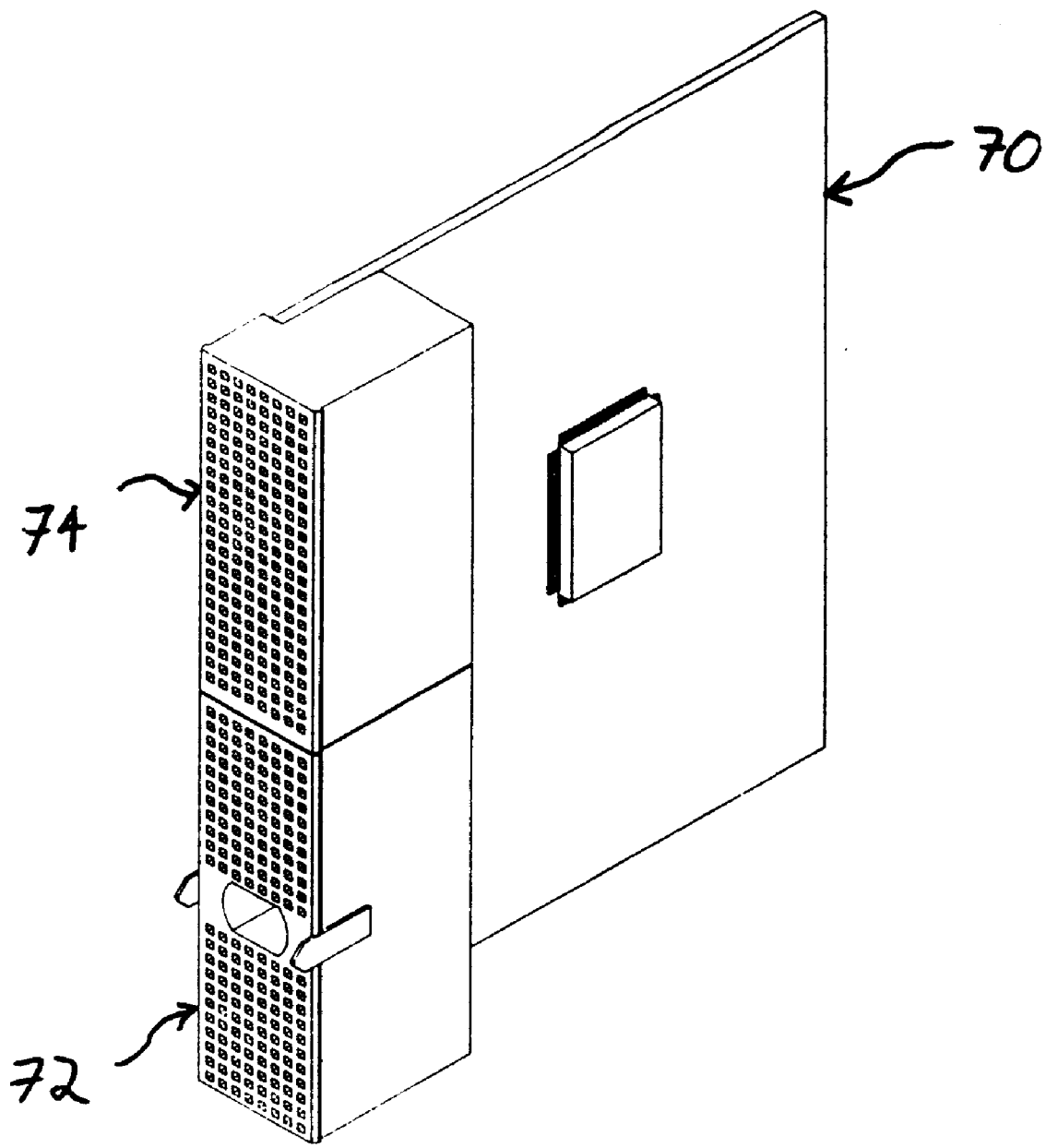
FIG. 9 is a perspective view of the bridge of FIG. 5 shown in greater detail.
Figure 10:
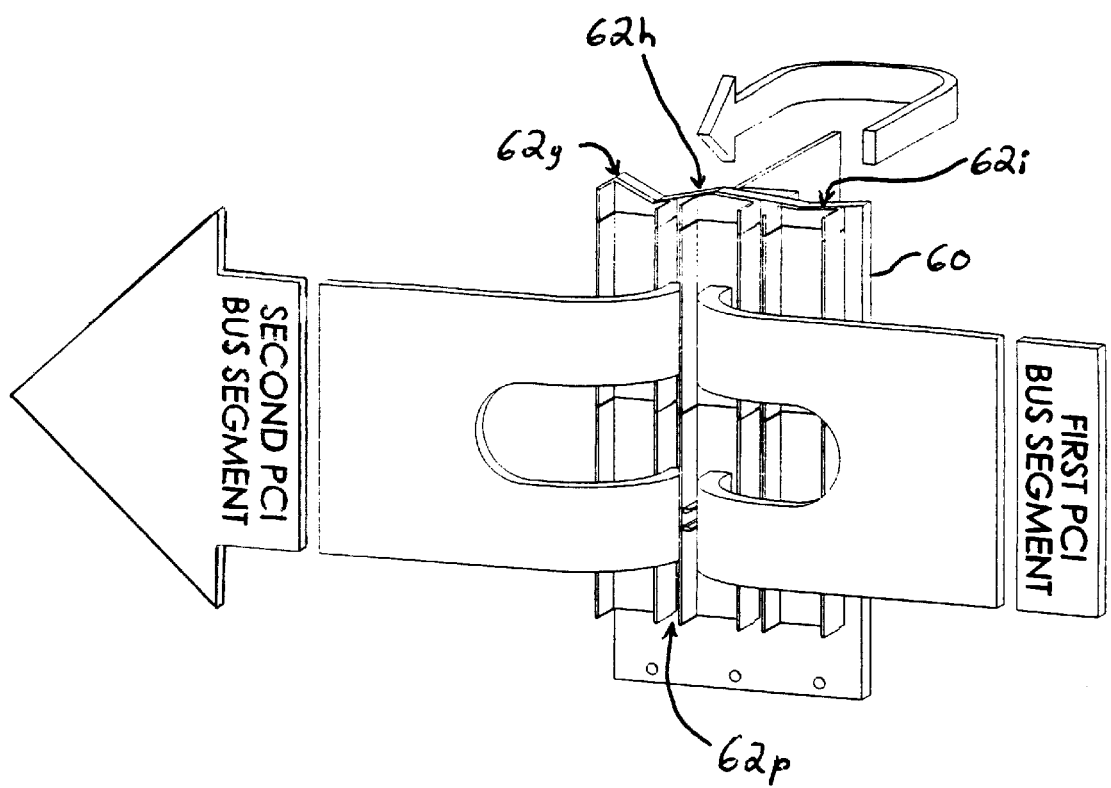
FIG. 10 is a perspective view of a cut-away section of the new backplane assembly and bridge shown in FIG. 5, which includes a schematic representation of bus signals flowing through the backplane assembly and bridge.

Given the design of the backplane assembly 50 of FIGS. 5–7 and the specific design of the pin locations 68 and routing connections 58 of the backplane 60 of FIG. 8, it becomes possible to bridge the cPCI bus without limiting the number of expansion devices that can be coupled to the backplane assembly and with minimal reduction in the number of slots available for I/O connection along the back side of the backplane assembly. Specifically, the bridge 70 having a Type-A, female 10-row connector 72 at a P1 position and a Type-B (22 pin per row), female 10-row connector 74 at a P2 position as shown in FIG. 9 can be coupled to the two 10-row connectors 56 of the backplane assembly 60 at positions P1–P2 of slot 62h. The bridge 70 plugs into rear of the backplane 60 in the same manner as a rear I/O board and can be either a 32-bit or 64-bit bridge. The bridge 70 receives all power and grounding by way of its connection with slot 62h. As shown in FIG. 10, during operation of the bus, the cPCI bus signals from a first PCI bus segment are provided to the bridge 70 by way of the pins at rows D–H of slot 62h. Upon being amplified and processed by the bridge, the cPCI bus signals are then output from the bridge and routed back into the backplane 60 to a second PCI bus segment by way of the "phantom" slot 62p formed by rows A–C of slot 62h.

Use of the bridge 70 in conjunction with the backplane assembly 50 allows bridging of the cPCI bus without limiting the number of expansion devices insofar as the expansion devices can still be connected at each of slots 62g, 62h and 62i. Connection of an expansion device at slot 62h remains possible despite the connection of the bridge 70 because of the effective creation of 7-row connectors along the front side of the backplane 60 by the 7-row shrouds 54 and the 6 rows of extended pins from the 10-row connectors 56. Additionally, connection of expansion devices at slots 62g and 62i remains possible because all communication between the bridge 70 and the backplane assembly 50 occurs at slot 62h, including the phantom slot 62p. That is, through the creation of the phantom slot 62p, both input to and output from the bridge 70 occurs at one slot 62h. Therefore, a significant advantage of the present embodiment of the invention over conventional bridging techniques is that, while conventional bridging techniques preclude connection of an expansion device to at least a system slot at which the bridge provides its output to the backplane, no such connection is lost in the present embodiment since the system slot occurs at the phantom slot 62p.

Use of the bridge 70 in conjunction with the backplane assembly 50 additionally allows bridging of the cPCI bus with only a minimum reduction in the number of I/O ports that are available on the back side of the backplane 60. Because the bridge 70 is coupled only to slot 62h along the back side of the backplane 60, only that slot is rendered unavailable for connection to I/O devices along the backplane. Further, because the bridge 70 is a plug-in card bridge rather than a mezzanine bridge, no neighboring slots are precluded from connection to I/O devices. The loss of availability of slot 62h for connection to I/O devices can, in certain embodiments, be overcome as well if the rear I/O transition board has low profile components or no components in the lower section of the board.

Figure 11:
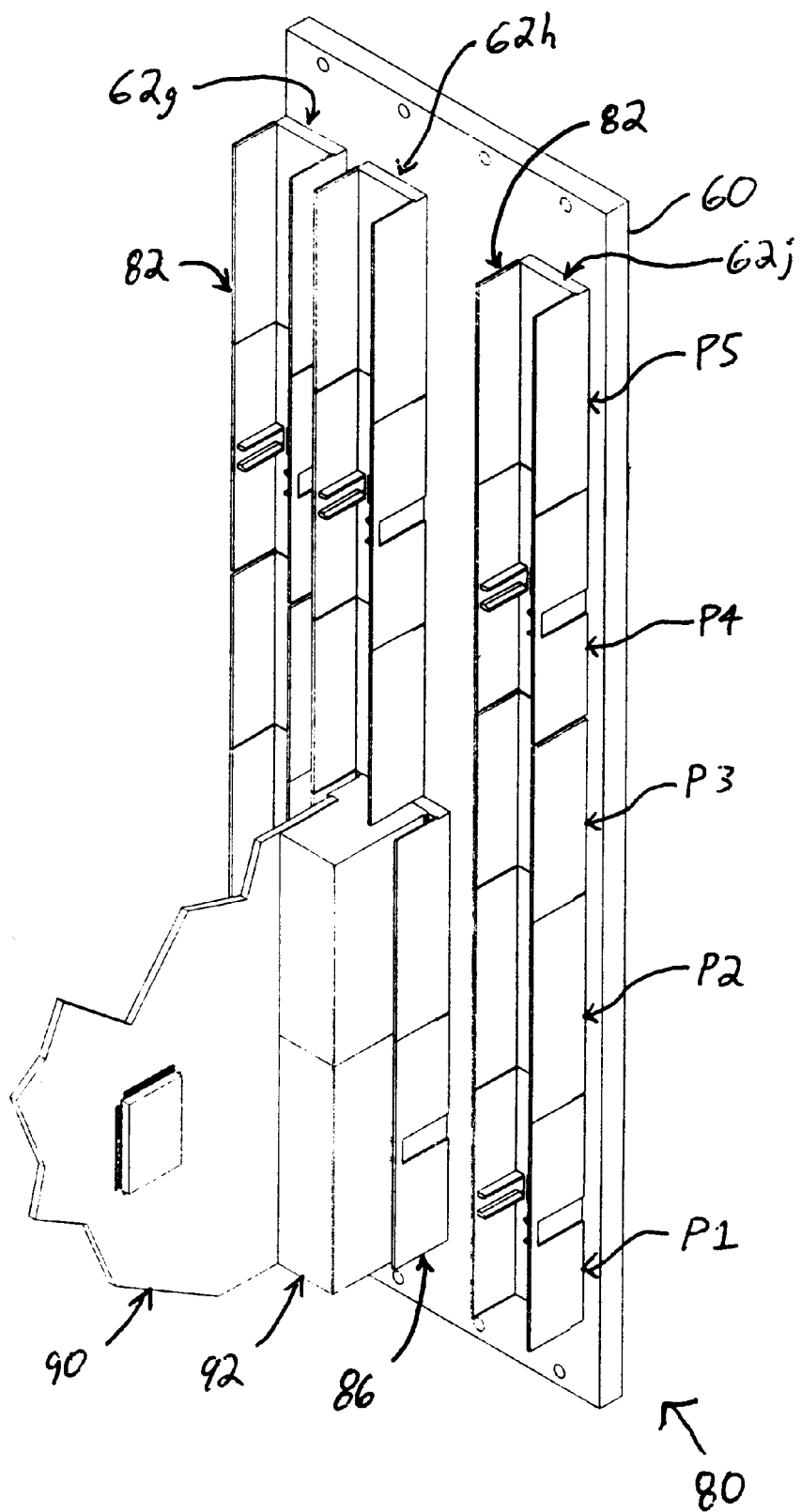
FIG. 11 is a perspective view of a cut-away section of a new backplane assembly coupled to a SBC in accordance with an additional embodiment of the present invention.
Figure 12:
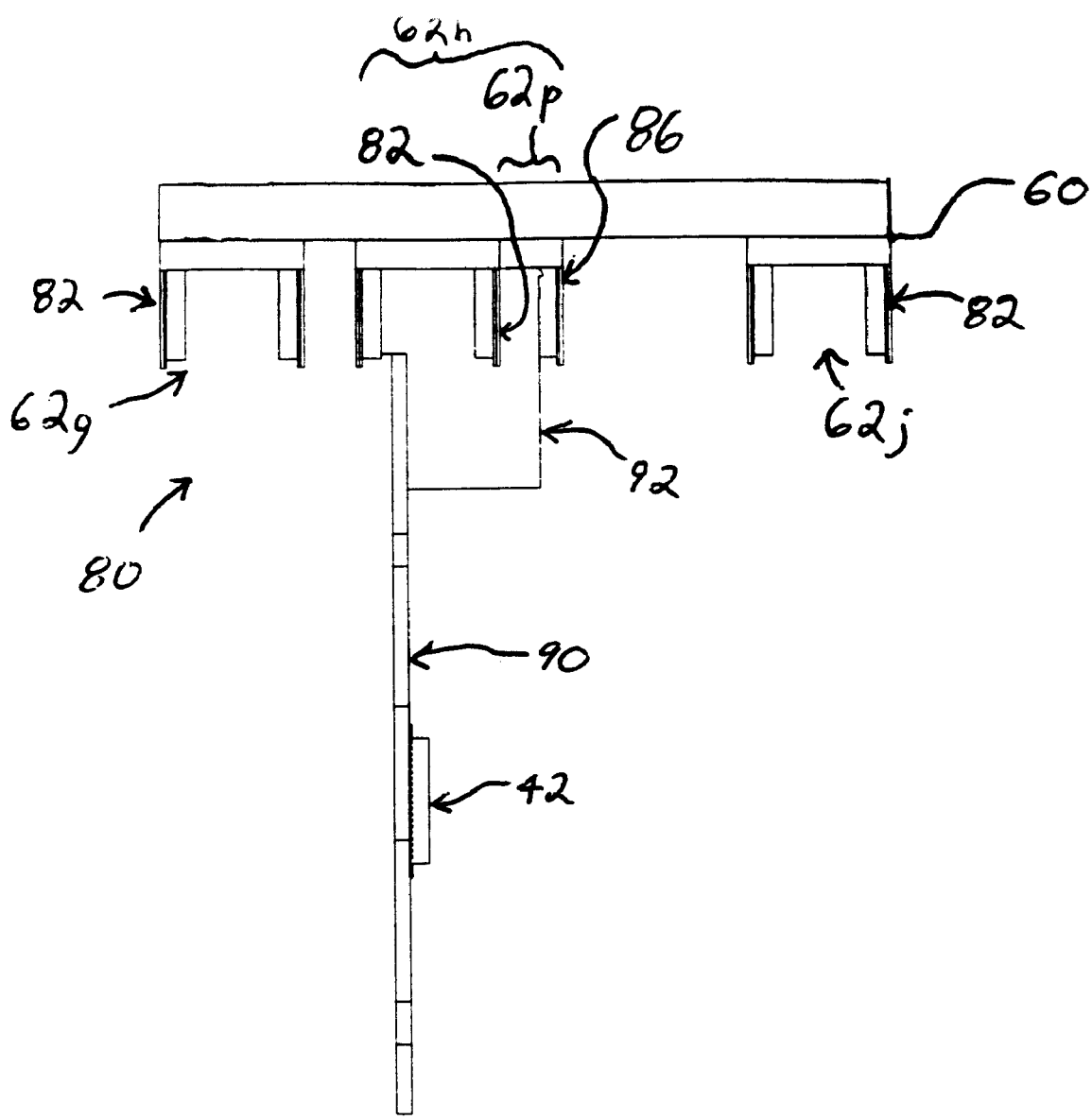
FIG. 12 is a plan view of a cut-away section of the new backplane assembly and SBC of FIG. 11.

Turning to FIGS. 11 and 12, a second embodiment of the new backplane assembly 80 includes essentially the same backplane 60 as in FIG. 5. That is, the backplane 60 includes a plurality of slots 62, including slots 62a–62o, and routing connections 58 and pin locations 68 that are nearly identical to those shown in FIG. 8. The most significant change in the routing connections 58 from those shown in FIG. 8 is that one of the pin locations 68 (specifically corresponding to pin C2) of row C at position P2 is tied to ground rather than left open, in compliance with the PCI Industrial Computers Manufacturers Group (PICMG) 2.0 R2.1 and R3.0 specifications for the cPCI system slot. Backplane assembly 80 further includes a plurality of 7-row connectors 82 along the slots 62 on the front side of the backplane 60. The 7-row connectors 82 are identical to those of backplane assembly 60 except insofar as 7-row connectors are missing from along slot 62i, and two 10-row connectors 86 are positioned along slot 62h at positions P1–P2 in place of 7-row connectors. The 7-row connectors 82 are missing from along slot 62i in order to provide sufficient space for the 10-row connectors 86 at slot 62h. In contrast to the backplane assembly 50, however, the backplane assembly 80 does not include any 10-row connectors along its back side, at slot 62h or otherwise.

Figure 13:
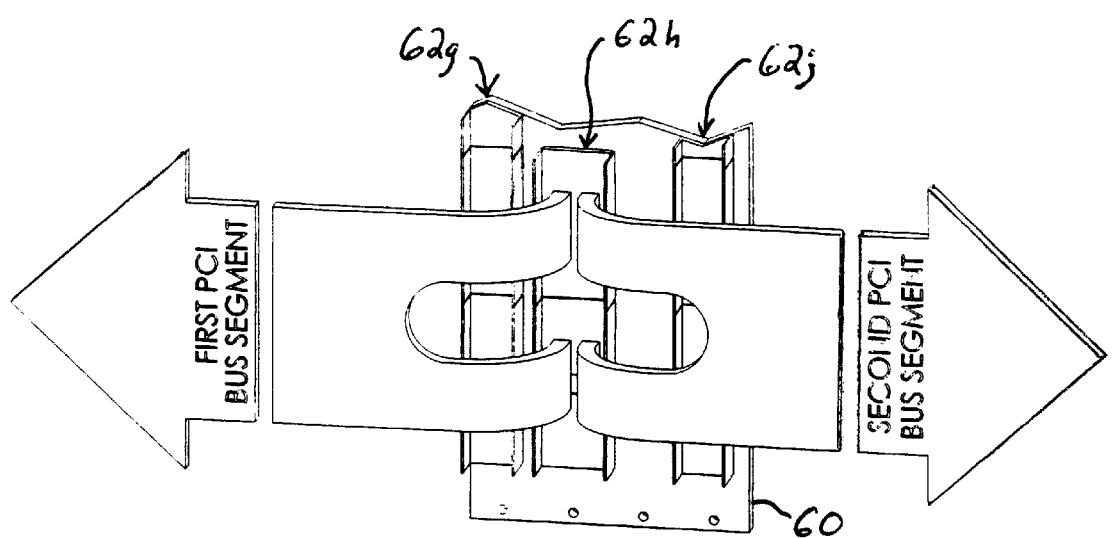
FIG. 13 is a perspective view of a cut-away section the new backplane assembly of FIGS. 11–12, which includes a schematic representation of bus signals flowing through the backplane assembly when it is connected to a SBC.

The backplane assembly 80 of FIGS. 11 and 12 is shown connected to a Single Board Computer (SBC) 90. The SBC 90 includes two 10-row female plugs 92 by which it is coupled to the pins of the two 10-row male connectors 86 at positions P1–P2. As with the conventional SBC 40 shown in FIG. 4, the SBC 90 further includes the CPU 42 and provides two separate bus signals to the backplane 60, which are then sent in different directions to different sets of slots along the backplane. More specifically, a first bus signal is provided to pins at pin locations 68 located in rows A–C of slot 62h, which form the phantom slot 62p, and a second bus signal is sent via pins located in rows D–Y of slot 62h. The first bus signal is then provided via routing connections 58 to slots 62a–62g, while the second bus signal is then provided via the routing connections to slots 62j–62o, as shown schematically by FIG. 13.

Figure 1:
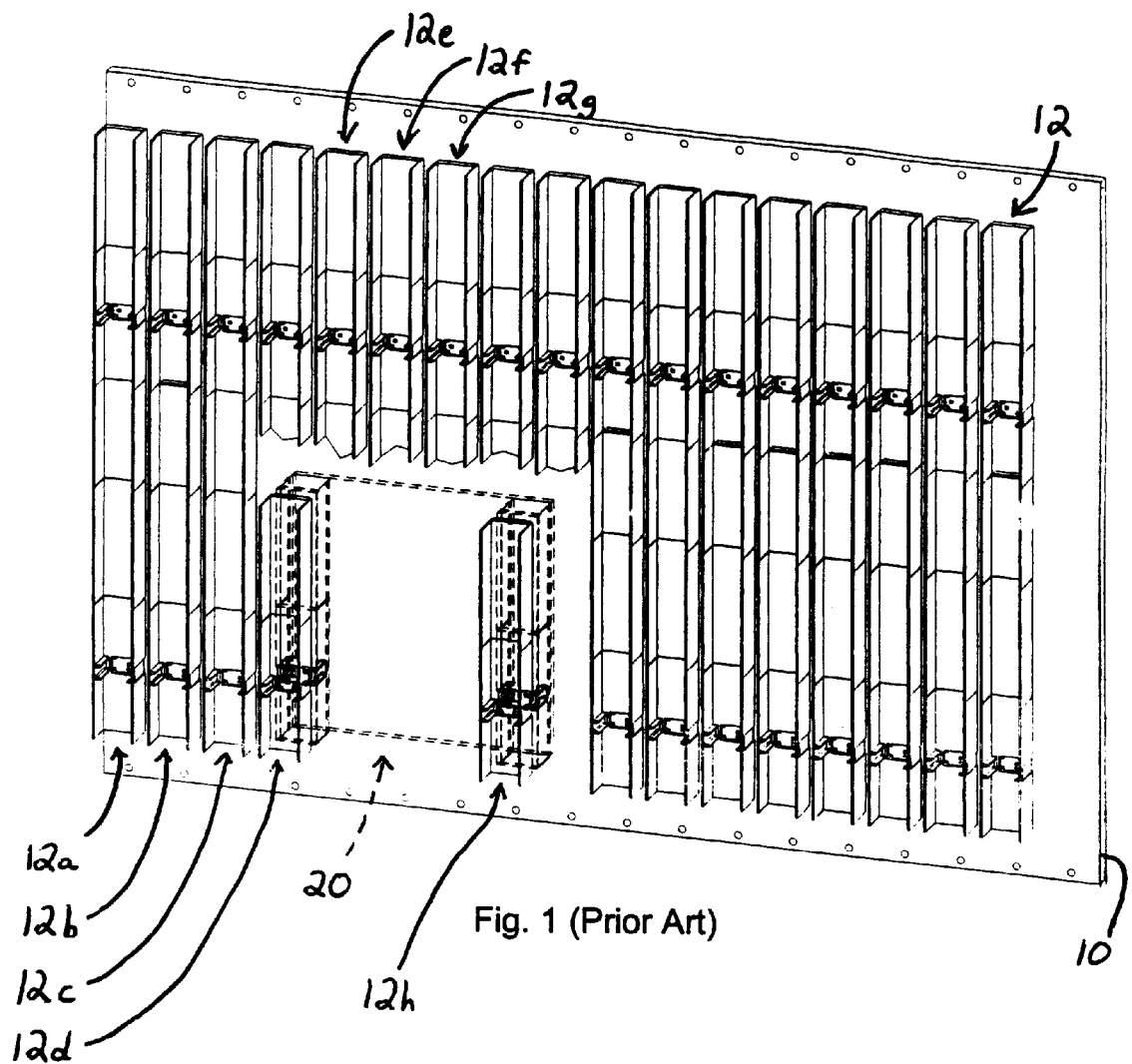
FIG. 1 is a perspective view of a prior art mezzanine bridge coupled to a prior art backplane assembly.
Figure 2:
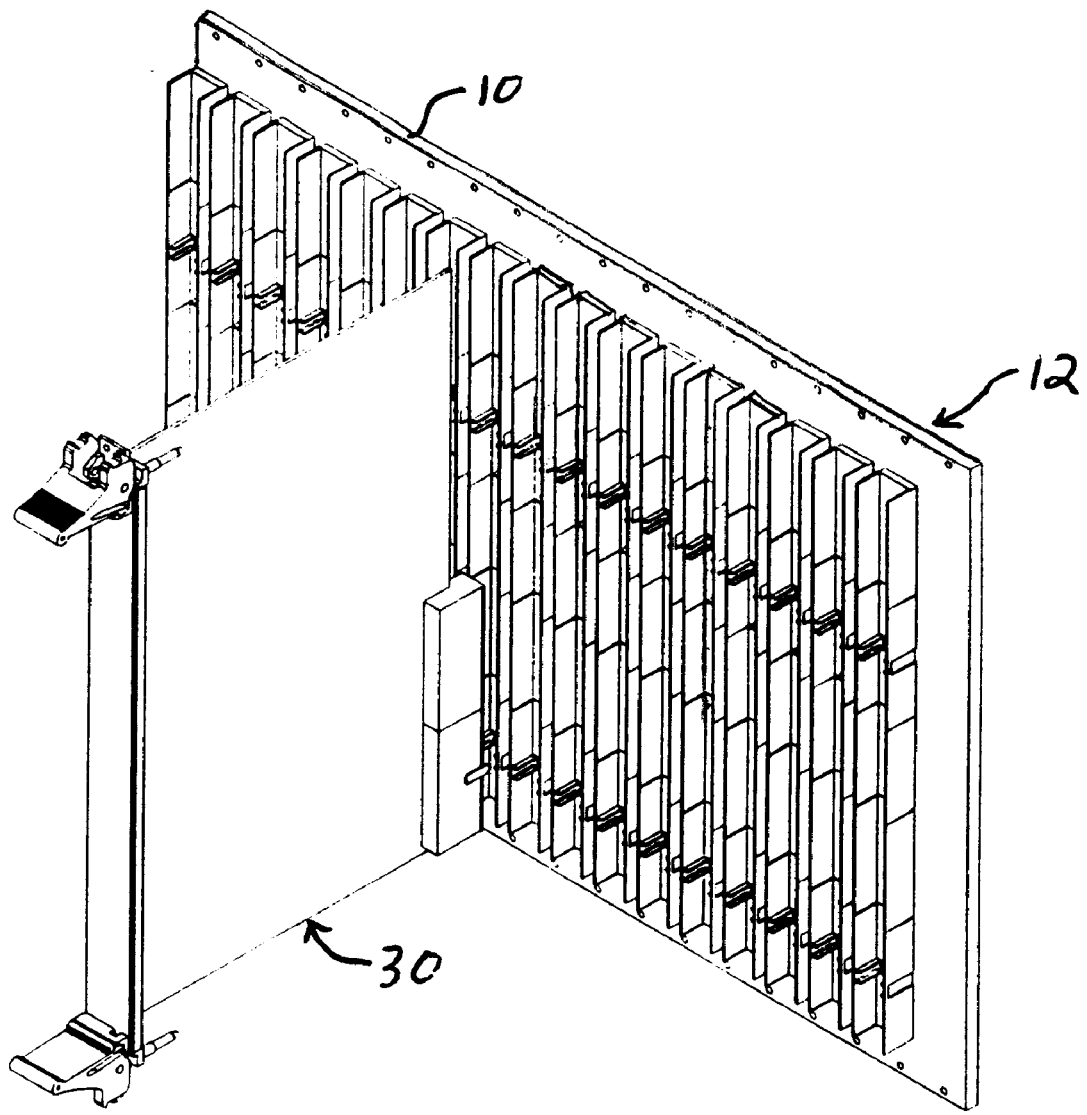
FIG. 2 is a perspective view of a prior art, single-card, plug-in card bridge coupled to a prior art backplane assembly.
Figure 3:
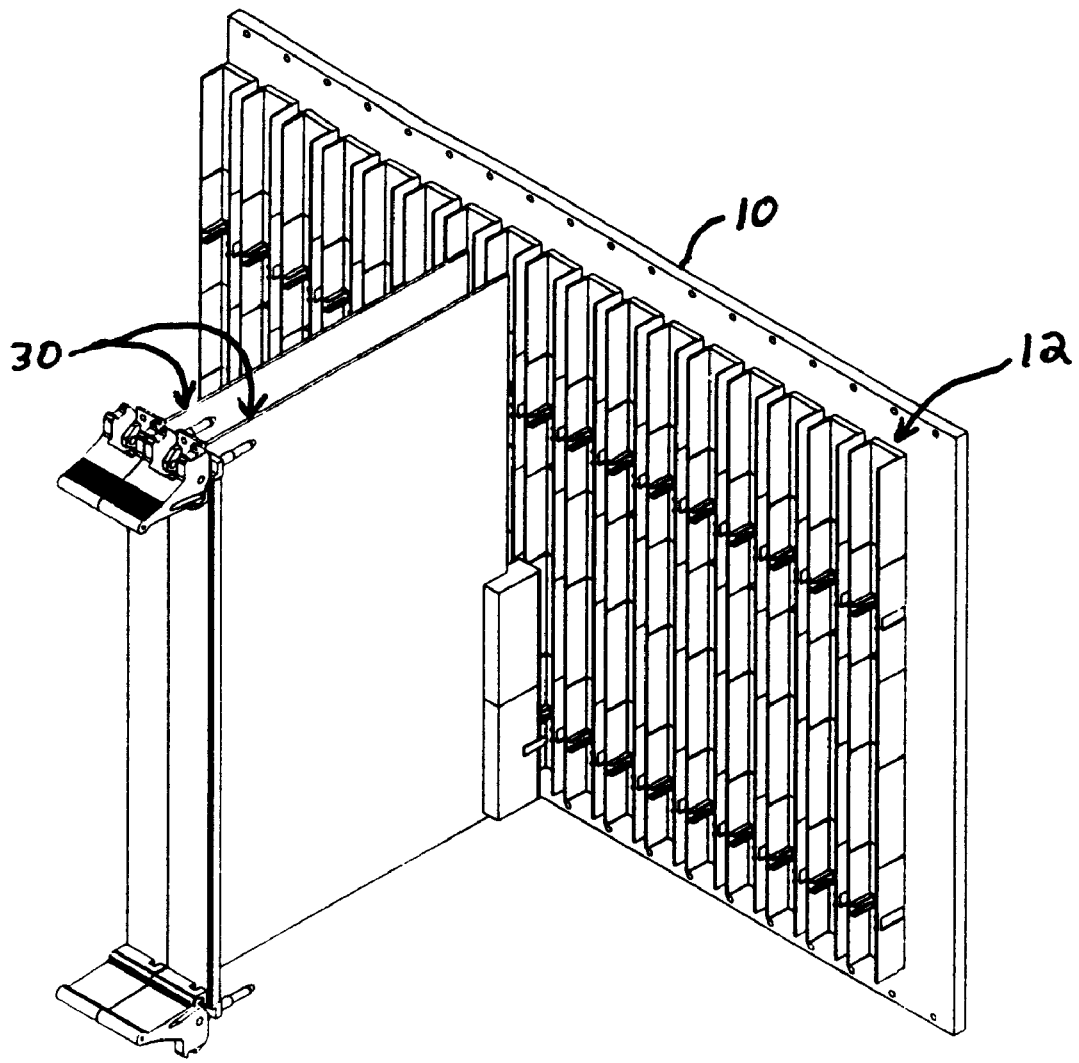
FIG. 3 is a perspective view of a prior art, dual-card, plug-in card bridge coupled to a prior art backplane assembly.
Figure 4:
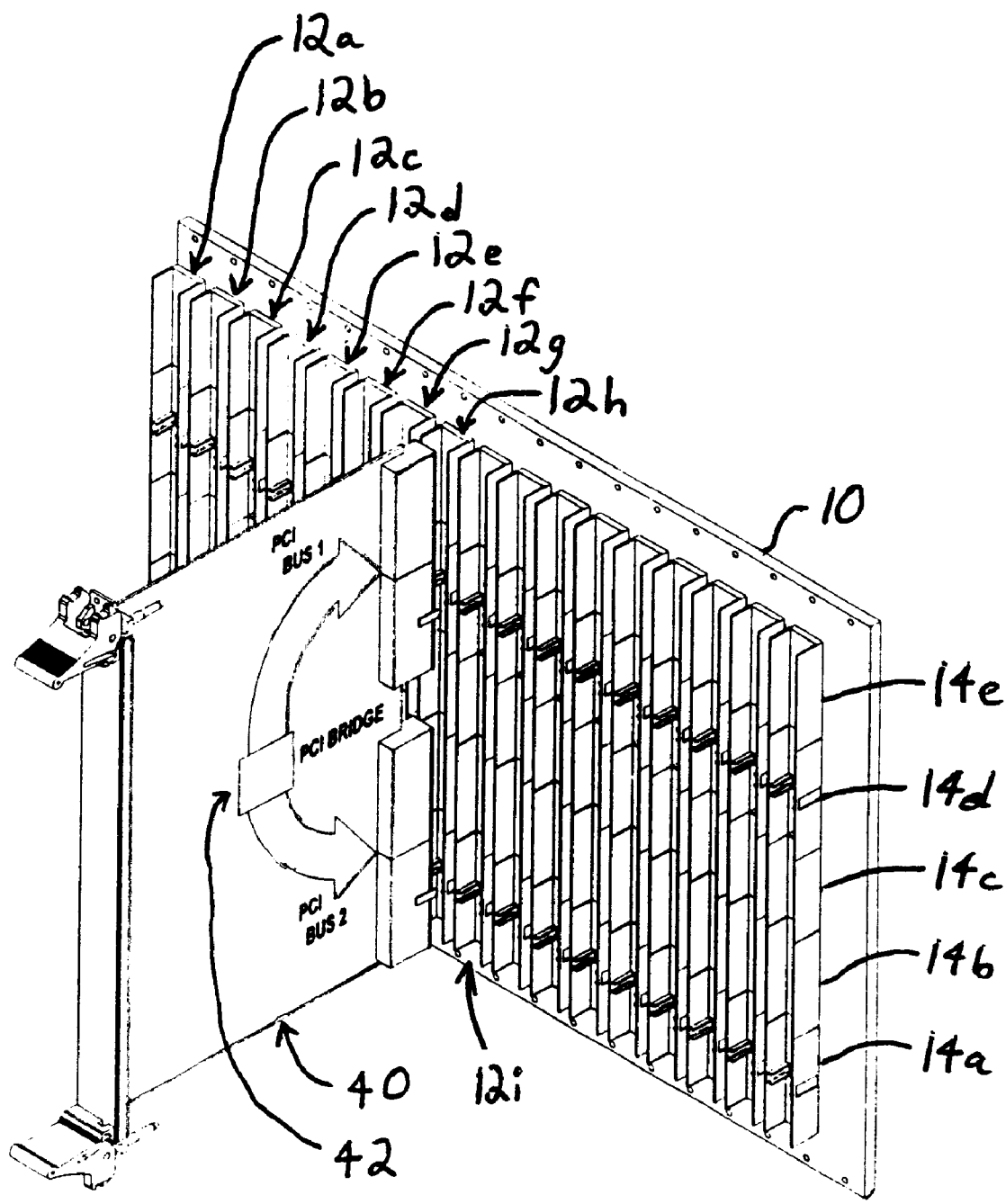
FIG. 4 is a perspective view of a prior art Single Board Computer (SBC) coupled to a prior art backplane assembly.

In comparison with several of the conventional strategies for coupling SBCs to a backplane as discussed with reference to FIG. 4, the embodiment of the new backplane assembly 80 and SBC 90 of FIGS. 11 and 12 can be implemented with less of a reduction in the number of slots 62 to which expansion devices have access. In particular, the SBC 90 can be designed without having a daughter board, and thus the width of the SBC is limited to approximately the width of 10-row connectors 86. Consequently, the SBC 90 does not block access to any neighboring slots, e.g., slot 62g. Further, by using the backplane assembly 80 and SBC 90, two separate cPCI busses can be routed (respectively to slots on either side of slot 62h) without violating the PICMG 7.3" trace length limit. Additionally, the embodiment of the new backplane assembly 80 and SBC 90 of FIG. 10 does not suffer from the interference that occurs in conventional embodiments in which either a daughter board with stubs is employed or the SBC is coupled to connectors at positions P1–P2 and positions P4–P5.

It will occur to those that practice the art that many modifications may be made without departing from the spirit and scope of the invention. For example, the exact routing and pin locations existing on the backplane can vary from that shown in FIG. 8, e.g., the phantom slot 62p can be positioned on the opposite side of the slot 62h, or the positions at which the 10 rows of pin locations occur can be at positions other than P1 and P2. Also, the arrangement of connectors and shrouds can differ from that discussed above. Additionally for example, with respect to the embodiment corresponding to FIGS. 5–7, the 7-row shrouds can be replaced with 7-row connectors having pins that extend through the backplane into mixed 10-row shrouds/connectors having three rows of pins that project into the backplane as well as multiple receptacles for receiving the extended pins from the 7-row connectors. In order to apprise the public of the various embodiments that may fall within the scope of the invention, the following claims are made:

What is claimed is:

1. A backplane assembly in accordance with cPCI bus architecture, the backplane assembly comprising:
    a backplane having a first surface and a second surface;
    a 10-row slot in the backplane, the 10-row slot including at least 9 rows of pin locations at which the backplane is configured to receive pins extending transversely into the backplane from at least one of the first surface of the backplane and the second surface of the backplane;
    a plurality of 7-row slots in the backplane, each of the 7-row slots including 7 rows of pin locations at which the backplane is capable of receiving pins extending transversely into the backplane from at least the first surface of the backplane, wherein at least a first 7-row slot exists on a first side of the 10-row slot and at least a second 7-row slot exists on a second side of the 10-row slot;
    a routing means for coupling at least some of the pin locations of the at least 9 rows of the 10-row slot with at least some of the pin locations of at least some of the 7 rows of at least some of the 7-row slots; and
    a plurality of connectors positioned adjacent to at least some of the 7-row slots and the 10-row slot.

2. The backplane assembly of claim 1, wherein none of the pin locations of 3 adjacent rows of the at least 9 rows of the 10-row slot are coupled by the routing means with any of the pin locations of the first 7-row slot.

3. The backplane assembly of claim 1, wherein the pin locations of the first 7-row slot are primarily coupled to pin locations within a first subset of the pin locations of the at least 9 rows of the 10-row slot, and the pin locations of the second 7-row slot are primarily coupled to pin locations within a second subset of the pin locations of the at least 9 rows of the 10-row slot.

4. The backplane assembly of claim 1, wherein the plane assembly is configured to carry a first bus signal provided between the first 7-row slot and the 10-row slot, and a second bus signal provided between the second 7-row slot and the 10-row slot.

5. A method of providing a first bus signal and a second bus signal from a SBC to a backplane assembly, the method comprising:

provinding a backplane with a first slot having at least 9 rows of pin locations including a first set of 6 rows of pin locations and a second set of 3 rows of pin locations;

providing on the backplane second and third slots respectively positioned on first and second sides of the first slot, the second and third slots each having at least 7 rows of pin locations;

attaching a 10-row connector to the first slot along a front side of the backplane, wherein the 10-row connector includes a first set of 6 rows of pins and a second set of 3 rows of pins that are respectively coupled to the first and second sets of pin locations;

attaching at least one 7-row connector to each of the second and third slots;

providing a set of routing connections within the backplane coupling the first set of 6 rows of pin locations and the second set of 3 rows of pin locations to the at least 7 rows of pin locations at the second and third slots, respectively, wherein the backplane assembly is capable of being coupled to the SBC at the 10-row connector, receiving the first bus signal at the first set of 6 rows of pins and receiving the second bus signal at the second set of 3 rows of pins.

6. The backplane assembly of claim 1, wherein the plurality of connectors include:

a plurality of 7-row connectors coupled to the first surface of the backplane adjacent to respective 7-row slots, wherein each of the 7-row connectors includes a plurality of pins that extend from within an interior of the backplane out through the first surface of the backplane into the respective 7-row connector;

at least one 7-row shroud coupled to the first surface of the backplane adjacent to the 10-row slot;

at least one 10-row connector coupled to the second surface of the backplane adjacent to the 10-row slot, wherein the at least one 10-row connector includes a plurality of extended pins that extend from within the interior of the backplane out through the first surface of the backplane into the at least one 7-row shroud and out through the second surface of the backplane into the at least one 10-row connector.

7. The backplane assembly of claim 6, wherein each of the 7-row connectors and the at least one 7-row shroud are configured to receive a plug by which a system device is coupled to the backplane assembly.

8. The backplane assembly of claim 6, wherein the plurality of extended pins of the at least one 10-row connector that extend out through both the front surface and the second surface of the backplane are the pins located at 6 rows D–Y of pin locations within the 10-row slot.

9. The backplane assembly of claim 6, wherein the at least one 10-row connector includes a plurality of normal pins that extend from within the interior of the backplane out through the second surface of the backplane into the at least one 10-row connector.

10. The backplane assembly of claim 9, wherein the plurality of normal pins that extend out through the second surface of the backplane are the pins located at 3 rows A–C of pin locations within the 10-row slot.

11. The backplane assembly of claim 9, wherein the at least one 10-row connector includes at least one row that is not populated.

12. The backplane assembly of claim 9, wherein the at least one 10-row connector is configured to receive a plug of a bridge.

13. The backplane assembly of claim 12, wherein the backplane is configured to provide a signal to the bridge by way of the plurality of extended pins and to receive a modified signal from the bridge by way of the plurality of normal pins.

14. The backplane assembly of claim 13, wherein the backplane is capable of providing the signal to the bridge and at the same time capable of providing the signal to a system element coupled to the at least one 7-row shroud by way of the plurality of extended pins.

15. The backplane assembly of claim 1:

a plurality of 7-row connectors coupled to the first surface of the backplane adjacent to respective 7-row slots, wherein each of the 7-row connectors includes a plurality of pins that extend from within an interior of the backplane out through the first surface of the backplane into the respective 7-row connector;

a 10-row connector coupled to the first surface of the backplane adjacent to the 10-row slot, wherein the 10-row connector includes a plurality of pins that extend from within the interior of the backplane out through the front surface of the backplane into the 10-row connector.

16. The backplane assembly of claim 15, wherein the 10-row connector is configured to receive a plug of an SBC.

17. The backplane assembly of claim 15, wherein the plurality of pins of the 10-row connector includes a first set of pins along rows A–C and a second set of pins along rows D–Y of the 10-row slot.

18. The backplane assembly of claim 17, wherein the backplane is configured to receive a first bus signal from the SBC by way of the first set of pins and to receive a second bus signal from the SBC by way of the second set of pins.

* * * * *

UNITED STATES PATENT AND TRADEMARK OFFICE
CERTIFICATE OF CORRECTION

PATENT NO. : 6,356,966 B1
DATED : March 12, 2002
INVENTOR(S) : Charles A. Loach and Julian J. Yutkus It is certified that error appears in the above-identified patent and that said Letters Patent is hereby corrected as shown below:

Column 2,
Line 12, "backplane slot" should be -- backplane at slot --.
Line 39, "with 110" should be -- with I/O --.

Column 4,
Line 41, "on backplane" should be -- on the backplane --.

Column 6,
Line 25, "section the" should be -- section of the --.
Line 55, "6010764-101" should be -- 601076-4-101 --.

Column 8,
Line 59, "cPC1" should be -- cPCI --.

Column 11,
Line 10, "the plane" should be -- the backplane --.

Signed and Sealed this

Tenth Day of September, 2002

Attest:

JAMES E. ROGAN
*Attesting Officer*  *Director of the United States Patent and Trademark Office*